(12) United States Patent
Yang et al.

(10) Patent No.: US 8,731,070 B2
(45) Date of Patent: May 20, 2014

(54) HYBRID LOOK-AHEAD AND LOOK-BACK DISTORTION ESTIMATION

(75) Inventors: Hua Yang, Plainsboro, NJ (US); Jill MacDonald Boyce, Manalapan, NJ (US); Xiaohui Wei, Arlington, TX (US)

(73) Assignee: Thomson Licensing, Boulogne-Billancourt (FR)

( * ) Notice: Subject to any disclaimer, the term of this patent is extended or adjusted under 35 U.S.C. 154(b) by 343 days.

(21) Appl. No.: 12/312,796

(22) PCT Filed: Jun. 27, 2007

(86) PCT No.: PCT/US2007/015112
§ 371 (c)(1),
(2), (4) Date: May 27, 2009

(87) PCT Pub. No.: WO2008/076148
PCT Pub. Date: Jun. 26, 2008

(65) Prior Publication Data
US 2010/0278275 A1  Nov. 4, 2010

Related U.S. Application Data

(60) Provisional application No. 60/875,053, filed on Dec. 15, 2006.

(51) Int. Cl.
*H04N 7/12* (2006.01)
*H04N 7/26* (2006.01)
*H04N 7/36* (2006.01)

(52) U.S. Cl.
CPC .... *H04N 19/00175* (2013.01); *H04N 19/00672* (2013.01)
USPC ................................... 375/240.27

(58) Field of Classification Search
CPC .............. H04N 19/00175; H04N 19/00672
USPC ............. 375/240.01–240.29, 130–153; 704/500–504
IPC ..... H04N 7/12, 11/04, 7/24, 7/26, 11/02; H04B 1/66
See application file for complete search history.

(56) References Cited

U.S. PATENT DOCUMENTS

| | | |
|---|---|---|
| 7,106,907 B2 | 9/2006 | Lin et al. |
| 2003/0099298 A1 | 5/2003 | Rose et al. |

(Continued)

FOREIGN PATENT DOCUMENTS

| | | |
|---|---|---|
| JP | 2005354662 | 12/2005 |
| WO | WO2006078595 | 7/2006 |
| WO | WO2007084475 | 7/2007 |

OTHER PUBLICATIONS

Liang et al. : "Network-Adaptive Low-Latency Video Communication Over Best-Effort Networks," IEEE Transactions on Circuits and Systems for Video Technology, vol. 16, No. 6, Jan. 2006, pp. 72-81.*

(Continued)

*Primary Examiner* — Richard Torrente
(74) *Attorney, Agent, or Firm* — Robert D. Shedd; Xiaoan Lu (57) ABSTRACT

According to an implementation, a value of distortion is determined. The value is associated with at least a portion of a particular picture in a series of pictures. The value is based on distortion in the particular picture that is attributable to error in the particular picture or in a previous picture in the series. The value is also based on distortion in a subsequent picture in the series that is attributable to error in the particular picture or in a previous picture.

16 Claims, 4 Drawing Sheets

(56) References Cited

U.S. PATENT DOCUMENTS

2004/0076332 A1    4/2004    Lin et al.
2007/0160137 A1*  7/2007    Guo et al. ................. 375/240.1

OTHER PUBLICATIONS

De Vito et al.: "Model-based Distortion Estimation for Perceptual Classification of Video Packets," 2004 IEE 6th Workshop on Multimedia Signal Processing, 2004, pp. 79-82.*

Kim et al.: "Internet Video Packet Categorization with Enhanced End-to-End QoS Performance," 2002 Visiual Communications and Image Processing—VCIP, 2002, pp. 58-68.*

M. Beermann, M. Wien and J. Ohm, "Look-Ahead Coding Considering Rate/Distortion-Optimization," IEEE ICIP 2002, pp. 93-95, 2002.*

J.G. Kim, J. Kim and J. Kuo, "Internet Video Packet Categorization with Enhanced End-to-End QoS Performance," IMSC, Dept. of EE, USC, San Jose, pp. 58-68, Jan. 2002.*

Wei et al.:"Hybrid End-To-End Distortion Estimation and Its Application in Error Resilient Video Coding," IEEE, ICASSP 2007, I-837-I-840.

Zhang et al.:"End-To-End Distortion Estimation for RD-based Robust Delivery of Pre-Compressed Video," IEEE, Department of Electrical and Computer Engineering, 2001, University of California, CA, pp. 210-214.

Zhang et al.:"Video Coding with Optimal Inter/Intra-Mode Switching for Packet Loss Resilience," IEEE Journal Journal on Selected Areas in Communications, vol. 18, No. 6, Jun. 2000, pp. 966-976.

Wiegand et al.:"Error-Resilient Video Transmission Using Long-Term Memory Motion-Compensated Prediction," IEEE Journal on Selected Areas Communications , vol. 18, No. 6, Jun. 2000, pp. 1050-1062.

Yang et al:"Optimal End-to-End Distortion Estimation for Drift Management in Scalable Video Coding," Apr. 2002, Department of Electrical and Computer Engineering, University of California, CA, pp. 1-11.

Deng et al.:"A Rate-Distortion Optimized Real Time Intra-Update Method for Packet Video Transmission," IEEE, 2003, pp. 915-918.

Schuster et al.:"A Review of the Minimum Maximum Criterion for Optimal Bit Allocation Among Dependent Quantizers," IEEE Transactions on Multimedia, vol. 1, No. 1, Mar. 1999, pp. 3-17.

Yang et al.:"Advances in Recursive Per-Pixel Estimation of End-To-End Distortion for Application in H.264," Sep. 2005, Department of Electrical and Computer Engineering, University of California Santa Barbara, CA.

Liang et al.:"Analysis of Packet Loss for Compressed Video Does Burst-Length Matter?", Apr. 2003.

Lin et al.:"Bit-Rate Control Using Piecewise Approximated Rate-Distortion Characteristics," IEEE Transactions on Circuits and Systems for Video Technology, vol. 8, No. 4, Aug. 1998, pp. 446-459.

Yang et al.:"Concealment Aware Motion Estimation and Mode Selection for Error Resilient Video Coding," Corporate Research , Thomson Inc, Princeton, NJ, IEEE, ICIP 2006, pp. 2229-2232.

Hong et al.:"Error Concealment Algorithms for Compressed Video," Signal Processing: Image Communication 14 (1999) pp. 473-492.

Bandyopadhyay et al.:"Frame Loss Error Concealment for H.264/AVC," Thomson, Joint Video Team (JVT) of ISO/IEC MPEG & ITU-T VCEG, doc. JVT-P072, Jul. 24, 2005, pp. 1-12.

Wiegand et al.:"Lagrange Multiplier Selection in Hybrid Video Coder Control," IEEE, 2001, pp. 542-545.

Wang et al.:"Modeling of Transmission-Loss-Induced Distortion in Decoded Video," IEEE Transactions on Circuits and Systems for video Technology, vol. 16, No. 6, Jun. 2006, pp. 716-732.

Cote et al.:"Optimal Intra Coding of Block for Robust Video Communication Over the Internet," Signal Processing Image Communication 15 (1999) pp. 25-34.

Cote et al.:"Optimal Mode Selection and Synchronization for Robust Video Communication over Error-Prone Networks," IEEE Journal on Selected Areas in Communication, vol. 18, No. 6, Jun. 2000, pp. 952-965.

Stockhammer et al.:"Optimized Transmission of H.26UJVT Coded Video Over Packet-Lossy Networks," IEEE ICIP 2002. II-173-II-176.

Zhang et al.:"Prescient Mode Selection for Robust Video Coding," Department of Electrical and Computer Engineering, 2001, University of California, CA, IEEE, pp. 974-977.

Yang et al.:"Rate-Distortion Optimized Motion Estimation for Error Resilient Video Coding," , 2005, Department of Electrical and Computer Engineering, University of California, CA.

Ekmekci et al.:"Recursive Decoder Distortion Estimation Based on AR(1) Source Modeling for Video," 2004 International Conference on Image Processing (ICIP), IEEE, 2004, pp. 187-190.

Xiong et al. "Rate Control for Real-Time Video Network Transmission on End-to-End Rate-Distortion and Application-Oriented QoS", IEEE Transactions on Broadcasting, vol. 51, No. 1, Mar. 2005, pp. 122-132.

* cited by examiner

HYBRID LOOK-AHEAD AND LOOK-BACK DISTORTION ESTIMATION

This application claims the benefit, under 35 U.S.C. §365 of International Application PCT/US2007/015112 filed Jun. 27, 2007 which was published in accordance with PCT Article 21(2) on Jun. 26, 2008 in English and which claims the benefit of United States Provisional Patent Application No. 60/875,053 filed on Dec. 15, 2006.

TECHNICAL FIELD

At least one disclosed implementation relates to distortion estimation.

BACKGROUND

To achieve good video streaming performance, one issue that is typically addressed is how to mitigate the packet loss impact from imperfect network transmission. For this problem, a general and efficient framework that has been applied is end-to-end distortion (ED) based rate-distortion (RD) optimization (ED-RDO). To improve the error resilience of video encoding, a variety of ED-RDO based techniques have been proposed. In the video transport modules, ED-RDO has been applied to optimize the selection of packet delivery policies. To achieve good ED-RDO performance, one challenge is how to accurately estimate the ED.

Typical ED estimation schemes, that operate on a sub-frame level, estimate the ED of the current frame by considering the error propagation from all the past frames up to the current frame. Errors may propagate, for example, because of inter-frame coding in which a current frame is compressed using a previous frame as a reference frame. Thus, if there is an error in the reference frame, then the current frame will also reflect the error. Other ED estimation schemes, that operate on a frame-level, estimate the ED of the current frame by considering errors in future frames that are attributable to an error in the current frame.

SUMMARY

According to a general aspect, a value of distortion is determined. The value is associated with at least a portion of a particular picture in a series of pictures. The value is based on distortion in the particular picture that is attributable to error in the particular picture or in a previous picture in the series. The value is also based on distortion in a subsequent picture in the series that is attributable to error in the particular picture or in a previous picture.

The details of one or more implementations are set forth in the accompanying drawings and the description below. Even if described in one particular manner, it should be clear that implementations may be configured or embodied in various manners. For example, an implementation may be performed as a method, or embodied as an apparatus configured to perform a set of operations or an apparatus storing instructions for performing a set of operations. Other aspects and features will become apparent from the following detailed description considered in conjunction with the accompanying drawings and the claims.

DETAILED DESCRIPTION

At least one implementation described in this disclosure presents a novel hybrid end-to-end distortion (ED) estimation scheme for complexity scalable error resilient video coding. The inventors have realized that typical systems are limited in their approach to estimating ED, and can be characterized as either "look-back-only" or "look-ahead-only". Such look-back-only and look-ahead-only ED estimation systems typically yield either high computation complexity or low estimation accuracy, respectively. Unlike such systems, the proposed solution is a general hybrid paradigm involving both "look-back" and "look-ahead" estimation. In "look-back" estimation, error propagation (EP) distortions from only a certain number of previously coded frames are exactly calculated at the pixel-level. This partial look-back yields a desired estimation accuracy. The impact of "look-back" ignored frame losses is compensated by using "look-ahead" frame-level EP approximation with extremely low computation complexity. By varying the number of "look-back" frames, different levels of computation complexity and estimation accuracy can be achieved. By providing complexity scalability, the proposed scheme can be more applicable in practical video streaming systems.

To achieve good video streaming performance, mitigating the packet loss impact from imperfect network transmission is generally a critical issue. For this problem, a general and efficient framework is ED based RD optimization (ED-RDO), which has been applied in video encoder modules and video transport modules to improve the error resilience of overall video streaming systems. To improve error resilience of video encoding, a variety of ED-RDO based techniques have been proposed to optimize various encoding decisions, such as prediction reference, motion vector (MV), quantization parameter (QP), and macroblock (MB) coding mode, etc. In the video transport modules, ED-RDO has been widely applied to optimize the selection of packet delivery policies. ED-RDO can also be used to jointly optimize the bit allocation between source and channel coding. To achieve good ED-RDO performance, a critical issue is to accurately estimate the involved ED, which is, more often than not, a highly challenging task.

At least one implementation in this disclosure focuses on the scenario of ED-RDO based error-resilient video encoding. This implementation presents a complexity-scalable ED estimation solution called HEED (hybrid estimation of ED) involving both pixel-level "look-back" and frame-level "look-ahead" estimation. This implementation provides a trade-off between estimation accuracy and computational complexity that is generally more flexible than existing ED estimation schemes. By changing the number of "look-back" frames, different levels of computation complexity and estimation accuracy can be achieved, which makes HEED more applicable in typical practical video streaming systems.

Figure 1:
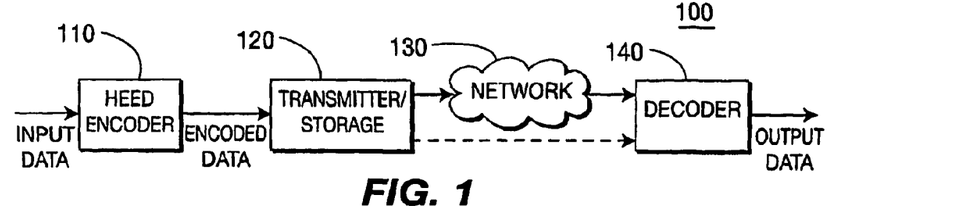
FIG. 1 includes a block diagram of an implementation of a system that includes distortion estimation.

Referring to FIG. 1, a system 100 is shown that provides a framework for discussing an implementation. The system 100 includes an encoder 110, a transmitter/storage unit 120, a network 130, and a decoder 140. The encoder 110 receives input data, which may be, for example, video data, audio data, multi-modal data, or other data for which distortion may be estimated. The encoder 110 encodes the input data according to a HEED implementation, and provides encoded data to the transmitter/storage unit 120.

The transmitter/storage unit 120 performs one or more of transmitting or storing the encoded data. If the encoded data is transmitted, the transmission uses the network 130, which may include, for example, the Internet, free space (for example, from a broadcast from a land-based tower or a satellite), or a private network. Clearly, other implementations are envisioned, such as, for example, a dedicated transmission path within a single device.

The decoder 140 accesses the encoded data by, for example, receiving the transmitted data from the network 130 or retrieving the stored data from the transmitter/storage unit 120 (indicated by the dashed line). The term "accessing" is used as a broad term that includes, for example, obtaining, retrieving, receiving, manipulating, or processing in various manners. The decoder 140 decodes the accessed data and provides the decoded data as the output data.

Existing ED estimation schemes can be roughly categorized into pixel-based, block-based, or frame-based approaches. The differences primarily relate, as the categories suggest, to the granularity of the processing.

An accurate ED estimate may be achieved by the pixel-based ROPE method, which was originally proposed for integer-pixel prediction, and later on advanced to cover sub-pixel prediction. However, along with its high estimation accuracy, ROPE also typically requires floating-point recursive calculation of the $1^{st}$ and $2^{nd}$ moments of decoder reconstruction of each pixel, which incurs a significant amount of computation complexity. Accordingly, ROPE is generally not desirable in practical real-time video streaming systems.

Another pixel-based approach is implemented in the JM (the JVT Joint Model) H.264/AVC reference encoder, where the distortion per pixel is calculated by exhaustive simulation of the decoding procedure and averaging over many (for example, 30) packet loss patterns. However, its complexity appears even higher than that of the ROPE method.

For low complexity, a simplified pixel-based distortion estimation (SPDE) approach may be used, where only the two most likely loss events (that is, the loss of the last two frames respectively) are considered. However, ignoring all the other possible loss events typically greatly compromises the estimation performance.

Alternatively, a block-based approach generates and recursively updates a block-level distortion map for each frame, which reduces the estimation complexity of pixel-based ROPE estimation roughly by a factor of the block-size (for example, 16 for 4×4 blocks). However, since inter-frame displacements involve sub-block motion vectors, a motion compensated block may inherit errors propagated from multiple blocks in prior frames. Hence, block-based techniques appeal to a more or less rough approximation (for example weighted averaging of propagated block distortion or motion vector approximation), which may build up to significantly degrade estimation accuracy.

In frame-level ED estimation, the ED of a whole frame is recursively calculated. In this case, all the complicating issues such as Intra-coded MBs, sub-pixel prediction, de-blocking filtering, etc. typically may be respectively modeled for each frame with different individual factors. Thus, the whole estimation typically involves negligible computational complexity. However, in practice, frame-level estimation is generally only applicable in frame-level ED-RDO problems, while for the concerned MB-level ED-RDO scenarios, such as ED-RDO motion estimation (ME) and mode selection (MS), either pixel- or block-based ED estimation is required.

Note that the above ED estimation schemes are typically "look-back-only" approaches. In these approaches, the ED of the current frame is calculated by considering error propagation from past frames, as illustrated generally in FIG. 2.

Figure 2:
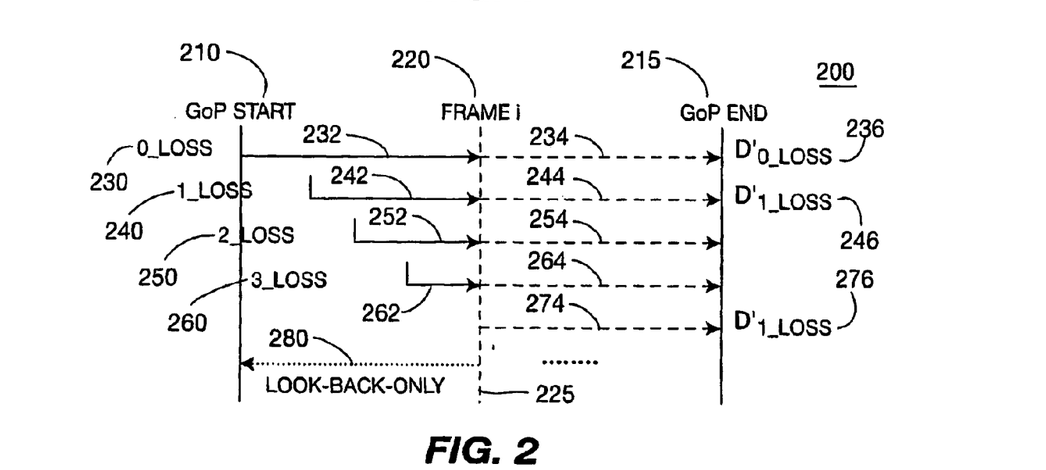
FIG. 2 includes a diagram illustrating an implementation of a distortion estimation technique that considers errors in previous frames.

Referring to FIG. 2, a diagram 200 depicts a group of frames (GOP) having a GOP Start 210, a GOP End 215, a Frame i 220 that is indicated with a vertical dashed line 225. The depicted GOP also includes frames 0, 1, 2, and 3, shown as occurring before (to the left of) the Frame i 220. The diagram 200 illustrates separately the impact of a loss of each of the frames 0, 1, 2, and 3, on the Frame i 220, as well as on the rest of the GOP. The impact on the Frame i 220 results, for example, from the use of inter-frame coding.

The loss of frame 0 is indicated by "0_loss" 230, which is followed by a solid line 232 leading up to the dashed line 225 of the Frame i 220. The solid line 232 indicates that a typical look-back scheme, when estimating the distortion associated with the Frame i 220, considers the impact of a loss of frame 0. The solid line 232 is followed, after the Frame i 220, with a dashed line 234 that extends to the GOP End 215. The dashed line 234 indicates that the impact of the loss of frame 0 continues to (possibly) have an impact on all subsequent frames in the GOP, but that this impact is not considered when estimating the distortion associated with the Frame i 220. These "future" impacts are considered when estimating the distortion for the future frames in the GOP. The dashed line 234 is followed by a term 236, referred to as $D'_{0\_loss}$, which refers to the impact of the loss of frame 0 on the entire GOP, including frames subsequent to the Frame i 220.

A similar analysis follows for the loss of frames 1, 2, and 3. Each of these is described below.

The loss of frame 1 is indicated by "1_loss" 240, occurring at a time later than (to the right of) the loss of frame 0. 1_loss 240 is followed by a solid line 242 leading up to the dashed line 225 of the Frame i 220. The solid line 242 indicates that a typical look-back scheme, when estimating the distortion associated with the Frame i 220, considers the impact of a loss of frame 1. The solid line 242 is followed, after the Frame i 220, with a dashed line 244 that extends to the GOP End 215. The dashed line 244 indicates that the impact of the loss of frame 1 continues to (possibly) have an impact on all subsequent frames in the GOP, but that this impact is not considered when estimating the distortion associated with the Frame i 220. These "future" impacts are considered when estimating the distortion for the future frames in the GOP. The dashed line 244 is followed by a term 246, referred to as $D'_{1\_loss}$, which refers to the impact of the loss of frame 1 on the entire GOP, including frames subsequent to the Frame i 220.

The loss of frame 2 is indicated by "2_loss" 250, occurring at a time later than the loss of frame 1. 2_loss 250 is followed by a solid line 252 leading up to the dashed line 225 of the Frame i 220. The solid line 252 indicates that a typical look-back scheme, when estimating the distortion associated with the Frame i 220, considers the impact of a loss of frame 2. The solid line 252 is followed, after the Frame i 220, with a dashed line 254 that extends to the GOP End 215. The dashed line 254 indicates that the impact of the loss of frame 2 continues to (possibly) have an impact on all subsequent frames in the GOP, but that this impact is not considered when estimating the distortion associated with the Frame i 220. These "future" impacts are considered when estimating the distortion for the future frames in the GOP. For simplicity, no corresponding D term is shown for the impact of the loss of frame 2 on the entire GOP.

The loss of frame 3 is indicated by "3_loss" 260, occurring at a time later than the loss of frame 2. 3_loss 260 is followed by a solid line 262 leading up to the dashed line 225 of the Frame i 220. The solid line 262 indicates that a typical look-back scheme, when estimating the distortion associated with the Frame i 220, considers the impact of a loss of frame 3. The solid line 262 is followed, after the Frame i 220, with a dashed line 264 that extends to the GOP End 215. The dashed line 264 indicates that the impact of the loss of frame 3 continues to (possibly) have an impact on all subsequent frames in the GOP, but that this impact is not considered when estimating the distortion associated with the Frame i 220. These "future" impacts are considered when estimating the distortion for the future frames in the GOP. For simplicity, no corresponding D term is shown for the impact of the loss of frame 3 on the entire GOP.

The loss of the Frame i 220 would also be expected to have an impact on the Frame i 220 and all subsequent frames in the GOP. The particular look-back scheme being analyzed considers the impact of a loss of the current frame (the Frame i 220), but not subsequent frames, in estimating the distortion associated with the Frame i 220. A line 280 (shown as dotted to distinguish it from the solid and dashed lines already used) illustrates the fact that the distortion estimation for the Frame i 220 only considers the impact on the Frame i 220 from previous and current (not future) loss events. However, the impact on subsequent frames in the GOP is shown by a dashed line 274 extending from the Frame i 220 to the GOP End 215. A term $D'_{i\_loss}$ 276 refers to the cumulative impact of the loss of the Frame i 220 on the rest of the GOP As we have noted, in the typical look-back scheme being analyzed, the impact of previous and current loss events is considered at each successive frame. Accordingly, after considering each frame in the GOP, the full impact of each loss event will have been accounted for, and a sum of all estimated distortions would equal the sum of all $D'_{j\_loss}$ terms (for all j in the GOP), such as the term 236.

Figure 3:
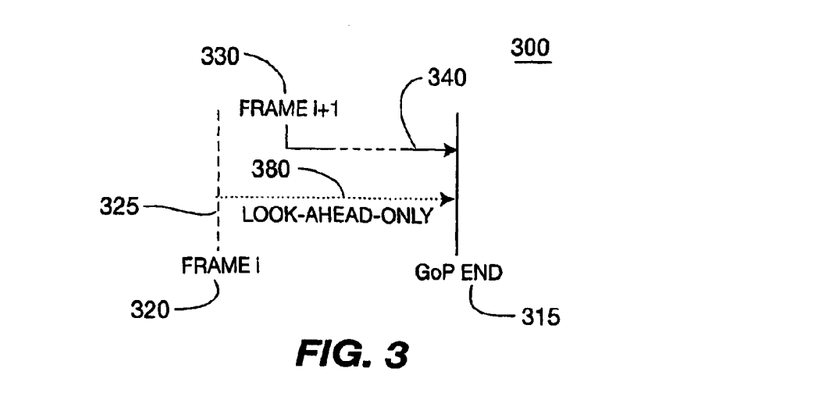
FIG. 3 includes a diagram illustrating an implementation of a distortion estimation technique that considers errors in subsequent frames.

A low complexity perceptual ED metric and the corresponding ED-RDO ME and MS may improve the overall perceptual video quality in the case of packet loss. A low complexity ED metric may account for some preference/characteristic of the Human Visual System, and hence be referred to as "perceptual". Such a metric would be different from typical ED metrics that calculate MSE (mean square error) distortion. One such perceptual metric (described in "Concealment-aware motion estimation and mode selection for error resilient video coding," *Proc. ICIP* 2006, Atlanta, October 2006) is a "look-ahead-only" ED estimation scheme, in which the incurred error propagation in all of the following frames in the same GOP is accounted for in the current frame ED calculation, as shown in FIG. 3 (described below). However, with error propagation from the previous frames completely ignored, the advantage of Intra-coding on stopping past error propagation is also neglected. Although a heuristic scheme may be used to compensate for the impact of neglecting the advantage of Intra-coding, overall, this issue typically still compromises the estimation accuracy and resultant ED-RDO coding performance of the "look-ahead-only" approach.

Referring to FIG. 3, a diagram 300 depicts a group of frames (GOP) having a GOP End 315, and a Frame i 320 that is indicated with a vertical dashed line 325. The depicted GOP also includes a Frame i+1 330 occurring after the Frame i 320. The diagram 300 illustrates the combined impact of all previous errors, as well as a loss of the Frame i 320, on the rest of the GOP. That impact begins with the Frame i+1 330 and continues (possibly) with all subsequent frames in the GOP. This impact is shown by a line 340 extending from the Frame i+1 330 to the GOP End 315. A line 380 (shown as dotted to distinguish it from the solid and dashed lines already used) illustrates the fact that the distortion estimation for the Frame i 320 only considers the impact on future frames in the GOP.

Additionally, typical look-ahead schemes apply a brute-force complete calculation to estimate the distortion. The inventors have recognized the advantage of an approximation and provide an approximation in at least one implementation.

In at least one implementation in this disclosure, we focus on the scenario of ED-RDO based error resilient video encoding. Most of the existing work assumes that only the first frame is coded as an I-frame, and all the rest of the frames are P-frames. In contrast, for this implementation we assume a GOP-based video coding framework, in which the first frame of each GOP is coded as an I-frame. Besides error resilience improvement, the GOP structure also helps to enable many useful features, for example, fast forward, fast backward, or fast channel change, and is commonly applied in practical video streaming systems.

To provide a motivation for the proposed HEED scheme, let us start from estimating the ED of the whole GOP, denoted by $E\{D_{GoP}\}$. A scheme called FODE (first order distortion estimate) approximates $E\{D_{GoP}\}$ with its first order Taylor expansion. In practice, the packet loss rate p addressed by error resilient video coding is not large, for example, p<10%. Beyond that, one has to use FEC or other techniques to effectively reduce p itself. With small p, the FODE model is typically fairly accurate. The MSE $E\{D_{GoP}\}$ is estimated as follows.

$$E\{D_{GoP}\} = D_{no\_loss} + p \cdot \sum_{i=0}^{N-1} \gamma_i. \tag{1}$$

Herein, N is the GOP size, and $D_{no\_loss}$ denotes the GOP distortion without any packet loss, that is, the source coding distortion only. Throughout this disclosure, for simplicity, we assume data of one frame is packetized into one packet. $\gamma_i$ is the 1st order Taylor expansion coefficient of frame i, which can be expressed as:

$$\begin{aligned} \gamma_i &= D_{i\_loss} - D_{no\_loss} \\ &= \sum_{j \geq i} \sum_{k=0}^{A-1} \left[ \left(\hat{f}^k_{j,i\_loss} - f^k_j\right)^2 - \left(\hat{f}^k_j - f^k_j\right)^2 \right] \\ &\cong \sum_{j \geq i} \sum_{k=0}^{A-1} \left(\hat{f}^k_{j,i\_loss} - \hat{f}^k_j\right)^2 \\ &= D'_{i\_loss}. \end{aligned} \tag{2}$$

Herein, A is the frame size. $f_j^k$ and $\hat{f}_j^k$ represent the original and encoder reconstructed (that is, no loss case) values of pixel k in frame j. $D_{i\_loss}$ and $\tilde{f}_{j,i\_loss}^k$ denote the GOP distortion and the decoder reconstructed pixel values, when only frame i is lost. In (2), the approximation is due to the omission of correlation terms. $D'_{i\_loss}$ denotes the error concealment (EC) and error propagation (EP) distortions due to the loss of frame i. (The prime is to indicate that the reference here is $\hat{f}_j^k$, but not $f_j^k$.) From the above equations, we can see that $E\{D_{GoP}\}$ can be regarded as a linear combination of $D'_{i\_loss}$, as is illustrated in FIG. 2.

Although FODE was originally proposed to address the optimization problems of coded video, we have realized that its simple linear representation of $E\{D_{GoP}\}$ renders useful insight as well on the concerned MB-level optimization tasks in the encoding process. In this case, when it comes to encoding a particular frame, one needs to identify for each MB their respective importance in terms of how they affect $E\{D_{GoP}\}$. For this, most, if not all, of the existing ED estimation approaches are "look-back-only" methods, where for the current frame, besides its own EC distortion, they basically estimate the overall past EP distortion due to the respective loss of each one of the previous frames in the GOP, as illustrated in FIG. 2. While the optimal ROPE approach accurately accounts for EP distortion from all the past individual frame loss events, to reduce complexity the SPDE approach only considers EP distortion from the loss of each one of the last two frames. We emphasize that when applied in optimizing coding decisions of frames, this "look-back-only" paradigm still yields good inter-frame synergy, on condition that each frame can accurately estimate past EP distortion, as is the case for the optimal ROPE estimate. Because, in that case, when optimizing the coding decisions of the current frame, there is no need to worry about incurred future EP distortion, as that will be accurately considered in the following frames' optimizations. However, in the SPDE case, each frame only considers limited EP effect from the last two frames, which means that beyond the following two frames, EP distortion from the current frame will be completely ignored in optimizations of the remaining frames. In this case, the "look-back-only" paradigm cannot be relied upon to provide good inter-frame synergy any more. On the other hand, the "look-ahead-only" approach shown in FIG. 3, although valuable, considers only the EP distortion in the following frames. Hence, it does not well account for the advantage of Intra-coding on stopping the past EP, which compromises the overall ED-RDO performance.

In light of the above analysis and motivated from the FODE distortion model, we propose a novel hybrid low complexity ED estimation approach, which we have designated as HEED. Similar to the approach in SPDE, HEED also considers for each pixel the exact past EP distortion from a certain number of past coded frames. However, instead of completely ignoring the impacts of all the other frame loss events, in HEED, we introduce a frame-level EP factor approximation to explicitly account for the EP distortion from the current frame to all the remaining frames in the GOP, and thus, yield a hybrid paradigm involving both pixel-level "look-back" and frame-level "look-ahead" estimation, as illustrated in FIG. 4.

Figure 4:
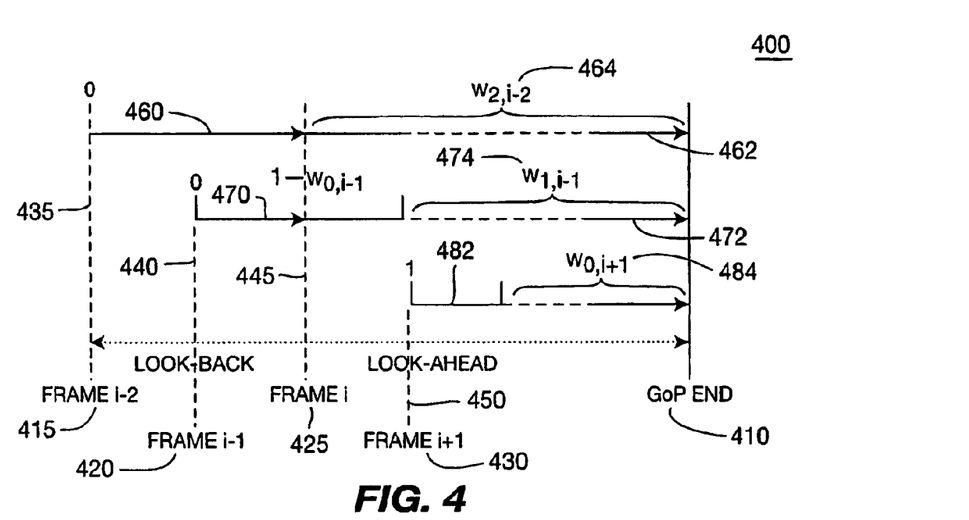
FIG. 4 includes a diagram illustrating an implementation of a distortion estimation technique that considers errors in previous frames and subsequent frames.

Referring to FIG. 4, a diagram 400 depicts a group of frames (GOP) having a GOP End 410, and including within the GOP a series of frames that includes a Frame i−2 415, a Frame i−1 420, a Frame I 425, and a Frame i+1 430. These four frames 415-430 are indicated by vertical dashed lines 435, 440, 445, and 450, respectively.

The Frame i 425 is under consideration. That is, a distortion is being estimated for the Frame i 425. The distortion estimation in this implementation considers three different sources of distortion. First, the impact on the Frame i 425 (and subsequent frames in the GOP) of a loss of the Frame i−2 415 is considered. Second, the impact on the Frame i 425 (and subsequent frames in the GOP) of a loss of the Frame i−1 420 is considered. Third, the impact on the Frame i+1 430 (and subsequent frames in the GOP) of a loss of the Frame i+1 430 is considered.

Regarding the first source of distortion, a solid line 460 represents the propagation of the distortion from the loss of the Frame i−2 415 up to the Frame i 425. Additionally, a solid line 462 (shown with dashes in the middle to indicate uncertain extent) shows the continued propagation of that distortion to the GOP End 410. As more fully explained below, a term $w_{2,i-2}$ is a weighting factor assigned to the distortion from the loss of the Frame i−2 415 at the Frame i 425 and subsequent frames. This weight is used to weight the distortion at the Frame i 425, as well as to weight the continued propagation of the distortion past the Frame i 425.

Regarding the second source of distortion, a solid line 470 represents the propagation of the distortion from the loss of the Frame i−2 415 up to the Frame i 425. Additionally, a solid line 472 (shown with dashes in the middle to indicate uncertain extent) shows the continued propagation of that distortion to the GOP End 410. As more fully explained below, several weighting factors are depicted. A term "$1-w_{0,i-1}$" is used to weight the distortion from the loss of the Frame i−1 420 at the Frame i 425. A term "$w_{1,i-1}$" is a weighting factor assigned to the distortion from the loss of the Frame i−1 420 at the Frame i+1 430, and is used to weight the distortion at the Frame i+1 430, as well as to weight the continued propagation of the distortion past the Frame i+1 430.

Regarding the third source of distortion, a solid line 482 (shown with dashes in the middle to indicate uncertain extent) shows the distortion from the loss of the Frame i+1 430, and the propagation of that distortion to the GOP End 410. As more fully explained below, several weighting factors are depicted. A "1" is assigned to the distortion from the loss of the Frame i+1 430 at the Frame i+1 430. A term "$w_{0,i+1}$" is a weighting factor assigned to the distortion from the loss of the Frame i+1 430, and this weight is used to weight the distortion at all subsequent frames after the Frame i+1 430 in the GOP. Note that zeros are shown as weights in the diagram 400 for distortion terms excluded from consideration at the Frame i 425.

Note that for this implementation, the third source of distortion arises from the use of the Frame i 425 in error concealment for the Frame i+1 430. In particular, this implementation assumes that an error concealment algorithm that uses motion copy is used to conceal the loss of the Frame i+1 430. Thus, the coding result (that is, motion vectors and reconstructions) of the Frame i 425 will affect the EP branch of the loss of the Frame i+1 430. Therefore, when we calculate frame i's ED estimate we consider the EP branch of frame i+1's loss. However, implementations may use other forms of error concealment, and this third source of distortion would merely be adjusted to account for the different concealment algorithms. For example, if we assume another EC, such as, for example, frame copy, then instead of the EP branch of frame i+1's loss, we may consider the EP branch of frame i's loss, in frame i's ED calculation.

As explained above, in the implementation of FIG. 4 we assume two "look-back" frames. Note that the derivation can be easily generalized to accommodate any other number of "look-back" frames, which thus renders complexity scalability. $w_{0,i}$ denotes the weighting factor for considering the frame i loss EP branch right at the loss of frame i, while $w_{1,i}$ and $w_{2,i}$ denote the weighting factors for considering the frame i loss EP branch respectively at one frame or two frames after frame i loss. Note that the three weighting factors of the same i in this implementation should be summed up to one, such that the complete EP branch of the loss of each particular frame is equivalently counted exactly once in ED estimation of all the frames in the GOP. In that case, summing up the estimated ED over all the frames will yield an accurate estimate for ED of the whole GOP (obviously, if a summation of ED for an entire GOP is not of interest, then implementations need not have weights that sum to one). This is illustrated in FIG. 5.

Figure 5:
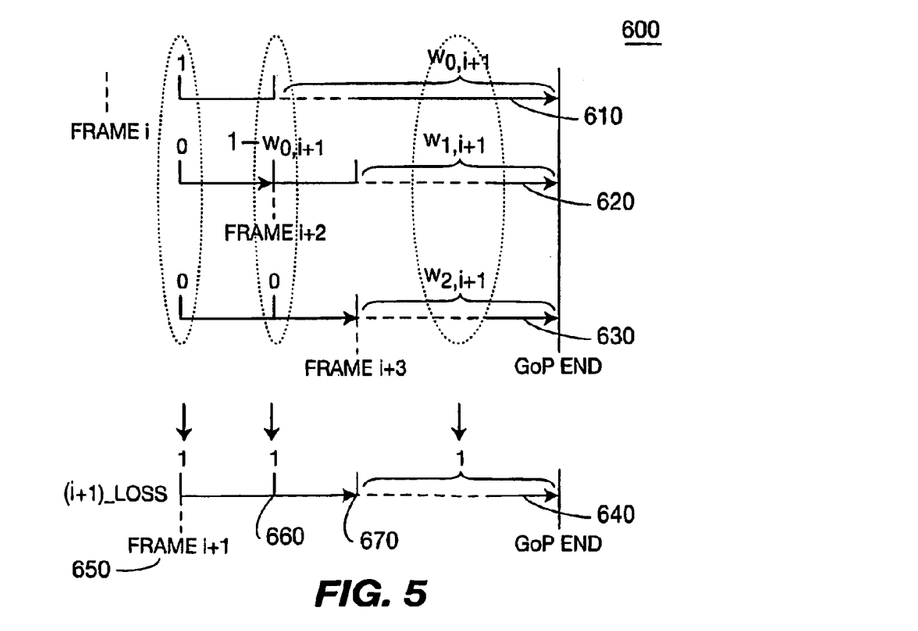
FIG. 5 includes a diagram illustrating the determination of the weights used in the implementation associated with FIG. 4.

Referring to FIG. 5, an illustration 600 shows that the EP branch of the loss of frame i+1 is involved in ED estimation at frame i, frame i+2, and frame i+3, where all the corresponding weights follow the specification of FIG. 4. Indeed, the illustration 600 reflects the constraint just described, that the complete EP branch of the loss of each particular frame is equivalently counted exactly once in ED estimation of all the frames in the GOP.

The three 1's in FIG. 5 shows that for the distortion term of each frame in the EP branch of frame i+1's loss, the summed weight is always one. This means that considering ED calculations of all the frames in the GOP, the frame i+1 loss EP branch is overall equivalently considered once. This is exactly the property we want for this model. Recall that Equation 1 shows the ED for the whole GOP, and Equation 2 shows the ED contribution of each EP branch. Excluding p, the weight of $\gamma_i$, (that is, the EP branch of the loss of frame i) in Equation 1 is always one. As for p, it always shows up in the model explicitly, and is already separated from our so called weight.

Referring again to FIG. 5, the weighting factor "$w_{0,i+1}$" shows up first in the ED calculation of frame i, to account for the EP branch of frame i+1's loss. Then the weighting factor "$(1-w_{0,i+1})$" shows up in the ED calculation of frame i+2, to account for the impact of the same EP branch of frame i+1's loss. We can see that the distortion term of frame i+2 in the EP branch of frame i+1's loss is considered twice, first in frame i's and then in frame i+2's ED calculation. From the perspective of the ED calculation of the whole GOP, the distortion term of every frame in the same EP branch of frame i+1's loss should preferably only be considered once (that is, the total weight should be "1"). Now, the distortion term of frame i+2 in the EP branch of frame i+1's loss is first weighted by $w_{0,i+1}$ in frame i's ED calculation and then weighted by $(1-w_{0,i+1})$ in frame i+2's ED calculation. Hence, its overall summed weight is "1". This is a necessary design constraint for the model.

Note that other (different) design constraints are used by other implementations. For example, weights may be assumed to sum to a number other than one. Further, implementations need not use weighting factors.

Next, we describe how to conduct HEED ED estimation at each particular frame. Herein, for simplicity, we assume motion-copy error concealment at the decoder, where when a frame is lost, motion-vectors (MV) from collocated MBs in the previous frame are used to conceal the current frame via motion compensation, as is known. As such, the MV or coding mode of the current frame MB will also affect the EC distortion of the collocated MB in the next frame. Note that the proposed HEED approach itself has no particular restrictions on the EC schemes.

Assuming the MB containing pixel k in frame i is Inter coded, our HEED method estimates ED of the pixel as:

$$E\{D_i^k\}=D_{i,no\_loss}^k+p \cdot D_{EP,i}^k, \quad (3)$$

where $$D_{EP,i}^k=D'_{EP,i,i-2\_loss}^k+D'_{EP,i,i-1\_loss}^k+D_{EP,i+1,i+1\_loss}^k. \quad (4)$$

The three right-hand side items of (4) correspond to the three considered EP branches in FIG. 4, respectively, which can be expressed as follows in equations 5-7. Equations 5-7 follow from the previous discussion, particularly the discussion of FIGS. 4 and 5.

$$D_{EP,i,i-2\_loss}^k=w_{2,i-2}D'_{i,i-2\_loss}^k(1+\alpha_{1\rightarrow(N-i-1)}), \quad (5)$$

$$D_{EP,i,i-1\_loss}^k=D'_{i,i-1\_loss}^k(1-w_{0,i-1}+w_{1,i-1}\alpha_{1\rightarrow(N-i-1)}), \quad (6)$$

$$D_{EP,i+1,i+1\_loss}^k=D'_{i+1,i+1\_loss}^k(1+w_{0,i+1}\alpha_{1\rightarrow(N-i-2)}), \quad (7)$$

where, $$\alpha_{1\rightarrow N}=\alpha+\alpha^2+\ldots+\alpha^N. \quad (8)$$

For any $L \geq 0$, $D'_{i,i-L\_loss}^k$ is defined as:

$$D'_{i,i-L\_loss}^k=(\tilde{f}_{i,i-L\_loss}^k-\hat{f}_i^k)^2. \quad (9)$$

Note that the "alpha" terms in Equations 5-7 represent the "look-ahead" portion. The "look-ahead" aspects of Equations 5-7 is further discussed below.

Equation 5 considers the impact of the EP branch of frame i−2's loss in the distortion calculation for the current frame i, which includes the distortion terms of frames from the current frame i to the end of the GOP. The consideration of distortion terms of the subsequence frames represents the so called "look-ahead" aspect.

Similar to Equation 5, Equation 6 considers the impact of the EP branch of frame i−1's loss in the distortion calculation for the current frame i, which includes the distortion terms of frames from the current frame i to the end of the GOP. The involvement of distortion terms of the subsequent frames again signifies the "look-ahead" aspect.

Equation 7 considers the impact of the EP branch of frame i+1's loss in the distortion calculation for the current frame i, which includes the distortion terms of frames from the next frame i+1 to the end of the GOP. Again, the involvement of distortion terms of the subsequent frames again signifies the "look-ahead" aspect.

In various, implementations, the decoder reconstructed value of a given frame (i) is based on a previous frame (i−1). In one implementation, if the previous frame (i−1) was lost then the decoder has already reconstructed the previous frame using an error concealment algorithm. To reconstruct the current frame, the decoder then applies the current frame's motion vector(s) to the reconstruction of the previous frame. In the same implementation, if the i−2 frame was lost, then the decoder has already reconstructed the i−2 frame, and has already reconstructed the previous frame (i−1) based on the reconstructed i−2 frame. So, the decoder then applies the current frame's motion vector(s) to the reconstructed i−1 frame.

Herein, $\alpha$ denotes the EP factor of a frame. We emphasize that modeling the ED effect of a frame with one single factor is a commonly adopted practice in existing frame-level ED estimation schemes for low complexity, where the overall factor $\alpha$ may involve various factors that account, for example, for Infra MBs, sub-pixel prediction, Intra-prediction, and de-blocking filtering, respectively. As an example, a simple scheme is to set $\alpha=1-\beta$, where $\beta$ denotes the Intra MB percentage of a frame.

On the other hand, the EP distortions from the last two frames are exactly calculated, whose resultant accuracy is even higher than that of the optimal ROPE approach, as we go through exactly the same EC and reconstruction process as the decoder would do when a frame is lost. However, similar exact calculation is impossible for the next frame EC distortion, as $\hat{f}_{i+1}^{k}$, and sometimes even $\hat{f}_{i}^{k}$, are not available at the time of coding frame i. In this work, we approximately estimate this term using the original references of frame i and i+1. Also, note that if a pixel is in an Intra coded MB, there will be no EP distortion terms from the last two frames, and only next frame EC distortion term stays in the above equations, as shown below. Herein, $D_{EP,i+1,i+1\_loss}^{k}$ has the same expression as in (7).

$$D_{EP,i}^{k} = D_{EP,i+1,i+1\_loss}^{k}. \tag{10}$$

In HEED, a critical issue is often how to determine the weighting factors $w_0$, $w_1$, and $w_2$. First, we note that using one single EP factor α to model the actual complicated EP process may not be accurate. Hence, it is typically desirable to evenly distribute the weight among the three factors. In that case, the overall modeling error will be reduced via averaging over the three items. Second, our HEED estimation will be applied in the concerned ED-RDO ME and MS problem. With the assumed motion-copy EC at the decoder, when a previous frame collocated MB is an Intra-MB, it will be treated the same as a Skip-MB, and the median MV from neighboring MVs will be used for concealment. In this case, although Intra coding of the current frame MB effectively stops existing EP from the past, it may also incur more next frame EC distortion and hence more resultant EP distortion in the following frames than Inter-mode coding, as an Inter-mode has more flexibility to find a better MV so as to yield lower next frame EC distortion. Hence, the ratio between $w_0$ and $w_1+w_2$ will directly affect the important Intra/Inter mode selection, and hence the overall ED-RDO performance. From experiments, an effective strategy is to give more weight to $w_0$ for the beginning frames in a GOP and less weight to it for the ending frames. Note that other effective weighting strategies are also possible. Finally, our adopted weighting factor setting is:

$$w_{0,i} = \frac{N-i-1}{N}, \tag{11}$$
$$w_{1,i} = w_{2,i} = \frac{1}{2}(1 - w_{0,i}).$$

Figure 6:
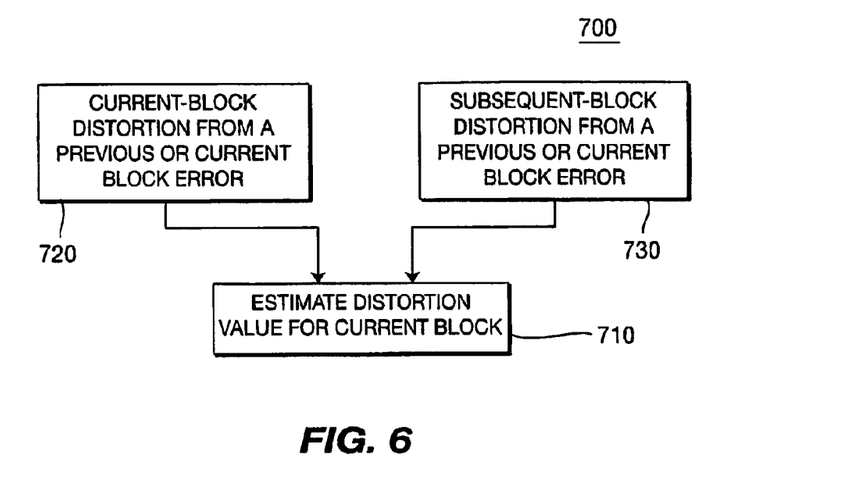
FIG. 6 includes a flow diagram of an implementation of a process for estimating distortion.

Having described a specific implementation for estimating distortion, we refer now to FIG. 6 which shows a general method 700 for estimating distortion for a block. The specific implementation already described, as well as other specific implementations described in this disclosure, provide implementations of the general method 700. The method 700 includes estimating a distortion measure for a current block of a digital image (710). The estimate (710) is based on at least two inputs 720 and 730. Input 720 is a current-block distortion attributable to a previous-block error. Input 730 is a current-block distortion attributable to the previous-block error. Thus, the estimate (710) is for the current block, and is based on a previous-block error. Further, the estimate (710) is based on (1) a look-back to the previous-block error to determine the impact of the previous-block error on the current block, and (2) a look-ahead to the impact of the previous-block error on a subsequent block.

Figure 7:
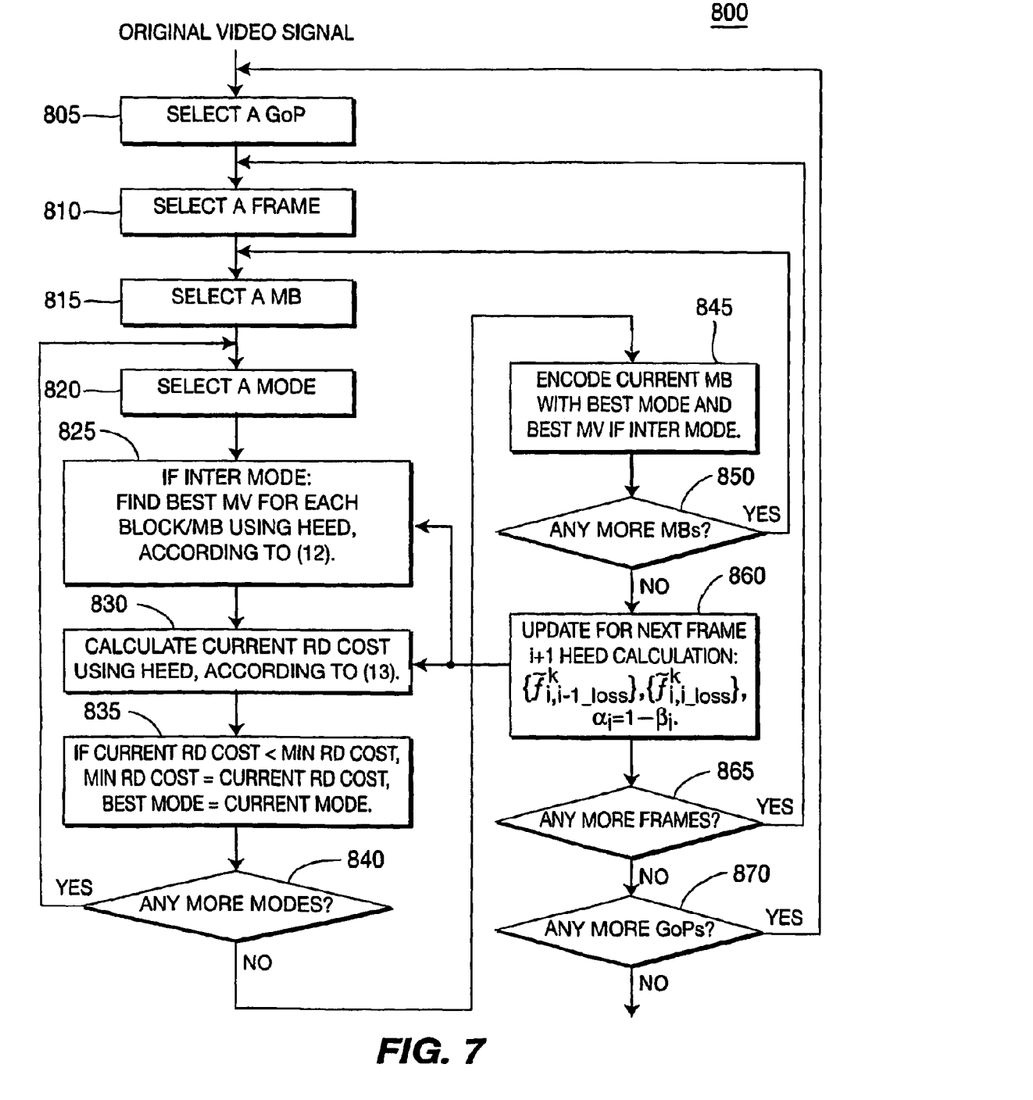
FIG. 7 includes a flow diagram of an implementation of another process for estimating distortion.

Referring back to the implementation described with respect to equations 3-11, the resultant $E\{D_i^k\}$ can then be applied in any ED-RDO based technique to optimize various encoding decisions as mentioned before. As an example, we show how to apply it in ED-RDO ME and MS as follows. The whole encoding scheme is shown in FIG. 7.

For Motion Estimation:

$$mv^* = \underset{mv}{\mathrm{argmin}}[D_{DFD,i}(mv) + p \cdot D_{EP,i}(mv) + \lambda_{MV} \cdot R_{mv,i}]. \tag{12}$$

For Mode Selection:

$$mode^* = \tag{13}$$
$$\underset{mode}{\mathrm{argmin}}[D_{no\_loss,i}(mode) + p \cdot D_{EP,i}(mode) + \lambda_{MODE} \cdot R_i(mode)].$$

Herein, mv* and mode* represent, respectively, the selected best motion vector and coding mode for block/MB i in frame n. (Note that now i denotes the block index, while n denotes the frame index.) $R_{mv}$ and R(mode) denote the corresponding coding rates. For example, $R_{mv}$ may refer to the bits needed to encode motion vectors only, and R(mode) may refer to the overall bits used to encode the whole macroblock. $\lambda_{MV}$ and $\lambda_{MODE}$ are the related Lagrangian multipliers. $D_{DFD,i}$ denotes displaced frame difference (DFD). Since the estimated $D_{EP,i}$, is MSE distortion, $D_{DFD,i}$ also bears a MSE form, as shown below.

$$D_{EP,i} = \sum_{k \in Blk\_i} E\{D_n^k\}. \tag{14}$$

$$D_{DFD,i}(mv) = \sum_{k \in Blk\_i} \left(f_n^k - \hat{f}_{n-1}^{k+mv}\right)^2. \tag{15}$$

In an implementation, Equations 12 and 13 are computed using Equations 14 and 15. Equation 14, in turn, is computed using Equations 3-9 and the approximate estimations discussed with respect to Equation 9.

As indicated, for each macroblock coding mode, the best motion vectors (if necessary) are selected according to Equation 12. After that, for all the coding modes, the best mode is selected according to Equation 13.

To give more insight, we can see that comparing with the proposed general hybrid paradigm existing pixel-based "look-back-only" and "look-ahead-only" approaches are simply its two special cases with "look-back" frames covering all the past coded frames or none of them respectively. Obviously, the hybrid paradigm provides a way to flexibly control the trade-off between computation complexity and estimation accuracy via including different numbers of past frames in "look-back" estimation, and thus, is generally more appropriate to be applied in practical video streaming systems, which may have quite different complexity constraints from each other. All the above derivation for the two "look-back" frame case can be easily generalized to accommodate any other number of "look-back" frames.

Last but not least, we emphasize that (3) gives the estimate of statistical ED, where the weight on EP distortion is the packet loss rate p. To more effectively measure perceptual video quality in the case of packet loss, more weight should be put on EP distortion than p. Since our HEED estimation is based on FODE approximation, only the impact from single frame loss events on ED is considered, which is the same as in the low complexity perceptual ED metric. Therefore, the packet loss rate p in (3) can be readily replaced with any appropriate perceptual weight to generalize the proposed HEED metric to be more closely correlated with perceptual lossy video quality. Better than the "look-ahead-only" perceptual distortion metric, the proposed HEED metric is a hybrid solution involving both "look-back" and "look-ahead" estimation. Hence, it more accurately accounts for the EP from the past frames, which results into better performance on Intra/Inter mode selection.

Extensive simulation results show that HEED achieves high estimation accuracy on GOP-level ED. Further, when applied in ED-RDO ME and MS, HEED significantly outperforms the other existing low complexity solutions.

At least one implementation described in this disclosure is motivated, at least in part, by recognizing that the expected distortion for a macro-block (or other unit) may be calculated or estimated for different coding strategies. The expected distortion, along with the rate of the coding strategy, may be used in a rate distortion equation to calculate the cost of that coding strategy, and the costs of various different coding strategies may then be used to select a coding strategy to use for the macro-block.

Although macro-blocks are mentioned, the ED may be estimated at various levels of gradation. Examples of different levels of gradation include the frame as a whole, individual blocks, individual pixels, or even at a sub-pixel level.

The ED estimate may be considered as the sum of an ED for each individual frame in a GOP. For each frame, the ED estimate can be computed in various fashions.

In a first example of estimating a frame's ED, each frame's ED estimate considers all possible loss events for previous frames. The ED estimate is based, then, on two factors: (i) the possibility of losing the current frame itself and (ii) the impact that the loss of any previous frame would have on the expected distortion of the current frame. The second factor is based on the fact that the loss of a previous frame may impact the decoding of the current frame if motion compensation is used to encode the current frame. The two factors also account for the fact that a previous frame may be used in the decoding of the current frame as part of an error concealment process if the current frame is lost. This is a look-back implementation.

In a second example of estimating a frame's ED, the ED estimate for the frame considers (i) the possibility of losing the next frame and (ii) the impact of such a loss (losing the next frame) on the expected distortion of all future frames. The second factor is based on the fact that the loss of the next frame may impact the decoding of the future frames if motion compensation is used to encode the future frames. This is a look-ahead implementation.

In a third example of estimating a frame's ED, the ED estimate for the frame considers three factors: (i) the possibility of losing the next frame, (ii) the possibility of losing only a limited number of previous frames, (iii) the impact that a loss of the next frame and the limited number of previous frames (loss events) would have on all future frames. This third example generally characterizes the implementation described by the Equations above.

Referring to FIG. 7, a method 800 is provided for encoding a frame. In one implementation of the method 800, the method 800 includes receiving a video signal, and processing the video in a series of nested loops with a loop for each GOP, a further loop for each frame in the GOP, and a further loop for each macroblock in the frame. Accordingly, the method 800 includes selecting a GOP (805), selecting a frame within the selected GOP (810), and selecting a MB within the selected frame (815). In processing the macroblock, a loop is used for each mode. Accordingly, the method 800 includes selecting a mode for the selected MB (820).

Continuing with the implementation, for the selected mode, if the mode is Inter mode, then the best MV for each sub-block of the MB is determined using Equation 12 (825). In one implementation, an MB is 16×16, and the modes break the MB into a series of sub-blocks having size of 8×8 (mode 1, 4 sub-blocks/MB) or 4×4 (mode 2, 16 sub-blocks/MB). The RD cost is then calculated for each sub-block, using the bracketed portion of Equation 13, and these sub-block RD values are summed for the MB to get the total RD cost for the MB (830). Note the operation 830 is performed for both Inter-mode modes and for Intra-mode modes.

The method 800 then determines whether the total RD cost for the MB is the lowest RD cost for the MB (840). If so, then the best mode is set to the currently selected mode (840).

The method 800 cycles through the possible modes by determining whether there are any more modes to be selected and processed (840). As a result, upon exiting operation 840 after having selected and processed all modes, the method 800 has determined the lowest total RD cost for that MB and has determined the associated (best) mode. The method 800 then encodes the current MB with the best mode and the best MV (845).

Continuing with the implementation, after encoding the selected MB (845), the method 800 cycles through the remaining MBs in the selected frame (850). The method 800 then calculates several variables that will be used in encoding the next frame (i+1) (860). The variables include two intermediate decoder reconstruction values (as discussed earlier in the discussion of Equation 9) and the current (frame i) alpha value. In one implementation, in encoding a frame i+1, the alpha for frame i is used as an estimate of the alpha for frame (i+1) and those beyond. These variables are supplied to the other operations of the method 800 that use the variables. In one implementation, the variables are supplied to operations 825 and 830, as indicated in FIG. 7. The method 800 then cycles through any remaining frames (865), and any remaining GOPs (870), before finishing.

Figure 8:
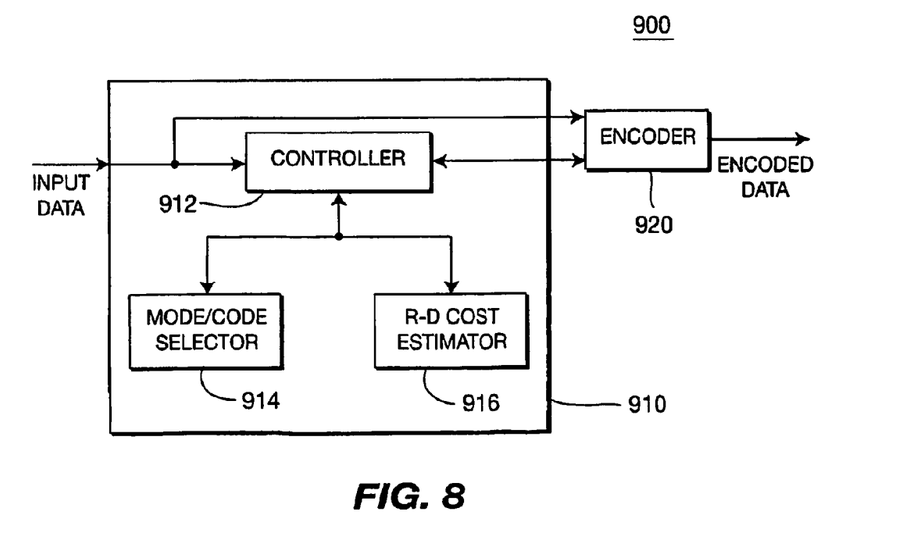
FIG. 8 includes a block diagram of an implementation of the encoder of FIG. 1.

Referring to FIG. 8, a system 900 is shown that is an implementation of the HEED encoder 110 from FIG. 1. The system 900 provides input data to an optimizer 910 that provides a mode selection and a code (for example, a MV) selection, as well as the input data, to an encoder 920 that encodes the data in accordance with the selected mode and code. The optimizer 910 includes a controller 912, a mode/code selector 914, and an R-D cost estimator 916, all of which are in communication with each other.

In one implementation, the system 900 performs the method 800 (of FIG. 7). The encoder 920 performs operation 845 for each MB and then performs operation 860 for each frame (and provides the output information back to the optimizer 910), and the optimizer 910 performs the remaining operations. Within the optimizer 910, (1) the mode/code selector 914 performs operations 825 and 835, (2) the R-D cost estimator 916 performs operation 830, and (3) the controller 912 performs operations 805-820, 840, 850, and 865-870.

Thus, for each MB of each frame, the controller 912 evaluates the modes/codes selected by the mode/code selector 914. The evaluation is based on the rate-distortion estimate provided by the R-D cost estimator 916, and more generally the evaluation is based on the distortion estimate as described above. The evaluation results in selecting an optimal mode/code for each MB, and in providing the optimal mode/code information to the encoder 920. The encoder 920 encodes the MBs of the frame and provides the feedback information to the optimizer 910 for the next frame.

Features and aspects of described implementations may be applied to various applications. Applications include, for example, a pre-processor for an encoder such as described above. Of course, the pre-processor may be incorporated into the actual encoder. The features and aspects herein described may, however, be adapted for other application areas.

The implementations described herein may be implemented in, for example, a method or process, an apparatus, or a software program. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device.

Implementations of the various processes and features described herein may be embodied in a variety of different equipment or applications, particularly, for example, equipment or applications associated with video transmission. Examples of equipment include video coders, video decoders, video codecs, web servers, cell phones, portable digital assistants ("PDAs"), set-top boxes, laptops, and personal computers. As should be clear from these examples, encodings may be sent over a variety of paths, including, for example, wireless or wired paths, the Internet, cable television lines, telephone lines, and Ethernet connections. Additionally, as should be clear, the equipment may be mobile and even installed in a mobile vehicle.

Additionally, the methods may be implemented by instructions being performed by a processor, and such instructions may be stored on a processor readable medium such as, for example, an integrated circuit, a software carrier or other storage device such as, for example, a hard disk, a compact diskette, a random access memory ("RAM"), or a read-only memory ("ROM"). A processor may also include a processor readable medium having, for example, instructions for carrying out a process.

As should be evident to one of skill in the art, implementations may also produce a signal formatted to carry information that may be, for example, stored or transmitted. The information may include, for example, instructions for performing a method, or data produced by one of the described implementations.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application and are within the scope of the following claims.

The invention claimed is:

1. A method comprising:
   determining a value of end-to-end distortion associated with at least a portion of a particular picture in a series of pictures, wherein the value is based on (1) distortion in the particular picture that is attributable to error in a previously coded picture in the series and (2) distortion in a subsequently coded picture in the series that is attributable to error in the particular picture, wherein the previously coded picture is coded before the particular picture and the subsequently coded picture is coded after the particular picture;
   determining a second value associated with at least the portion of the particular picture, wherein the value and the second value are based on different codes being applied to at least the portion of the particular picture;
   evaluating the different codes based on a comparison of the value and the second value;
   determining encoding decisions in response to the value of end-to-end distortion; and
   encoding the at least a portion of the particular picture in response to the encoding decisions.

2. The method of claim 1 wherein the value is further based on distortion, attributable to error in the particular picture or in the previously coded picture in the series, in all subsequently coded pictures in the series.

3. The method of claim 1 wherein the series of pictures is delineated by intra-coded pictures.

4. The method of claim 1 wherein the distortion in the particular picture and the distortion in the subsequently coded picture are both attributable to the same error.

5. The method of claim 1 wherein determining the value based on the distortion in the subsequently coded picture comprises approximating the distortion in the subsequently coded picture by scaling at least a portion of the distortion in the particular picture.

6. The method of claim 5 wherein scaling comprises using a scaling factor that is determined based on a code used for the particular picture.

7. The method of claim 5 wherein scaling comprises using a scaling factor that is determined based on a percentage of a picture, in the series, that is inter-coded.

8. The method of claim 7 wherein the scaling factor is determined based on a percentage of the particular picture that is inter-coded.

9. The method of claim 1 wherein determining the value is based on (1) distortion in the particular picture that is attributable to error in the previously coded picture in the series and (2) distortion in the particular picture that is attributable to error in a second previously coded picture in the series, wherein the second previously coded picture is coded before the particular picture.

10. The method of claim 1 wherein determining the value comprises weighting at least one distortion with a weight less than one, such that performing the method for multiple pictures in the series does not count the at least one distortion more than once.

11. The method of claim 1 wherein determining the value is further based on distortion in a picture in the series that results from loss of the picture and use of the particular picture to conceal the loss.

12. The method of claim 1 wherein:
   the distortion in the particular picture results from inter-coding the particular picture using the previously coded picture as a reference picture.

13. An apparatus comprising:
   a rate-distortion cost estimator configured to estimate a value of end-to-end distortion for at least a portion of a picture in a series of pictures, the estimate being based on (1) distortion, in the picture, resulting from error in a previously coded picture in the series and (2) distortion, in a subsequently coded picture in the series, resulting from error in the picture, wherein the previously coded picture is coded before the picture and the subsequently coded picture is coded after the picture, wherein the rate-distortion cost estimator is further configured to determine a second value associated with at least the portion of the picture, wherein the value and the second value are based on different codes being applied to at least the portion of the picture; and a controller configured to evaluate the different codes based on a comparison of the value and the second value.

14. The apparatus of claim 13, wherein the controller is configured to select a code from the different codes, for use in coding at least the portion of the picture, based on the estimated value of end-to-end distortion.

15. An apparatus comprising:

means for determining a code for at least a portion of a picture in a series of pictures;

means for estimating a value of end-to-end distortion for at least the portion of the picture, based on using the determined code to code at least the portion of the picture, the estimate being based on (1) distortion, in the picture, resulting from error in a previously coded picture in the series and (2) distortion, in a subsequently coded picture in the series, resulting from error in the picture, wherein the previously coded picture is coded before the picture and the subsequently coded picture is coded after the picture;

means for determining a second code for at least the portion of a picture;

means for estimating a second value associated with at least the portion of the picture, based on using the determined second code to code at least the portion of the picture; and means for evaluating the determined code and the determined second code based on a comparison of the value and the second value.

16. A non-transitory processor-readable medium having stored thereon instructions for causing one or more devices to perform at least the following:

determining an indication of an amount of end-to-end distortion associated with at least a portion of a picture in a series of pictures, the determining being based on (1) distortion, in the picture, resulting from error in a previously coded picture in the series and (2) distortion, in a subsequently coded picture in the series, resulting from error in the picture, wherein the previously coded picture is coded before the picture and the subsequently coded picture is coded after the picture;

determining a second amount associated with at least the portion of the picture, wherein the amount and the second amount are based on different codes being applied to at least the portion of the picture; and evaluating the different codes based on a comparison of the amount and the second amount.

* * * * *